(12) United States Patent
Sawa et al.

(10) Patent No.: US 9,068,037 B2
(45) Date of Patent: Jun. 30, 2015

(54) METHOD FOR PRODUCING RESIN COMPOSITE MATERIAL, AND RESIN COMPOSITE MATERIAL

(71) Applicant: SEKISUI CHEMICAL CO., LTD., Osaka, Osaka (JP)

(72) Inventors: Kazuhiro Sawa, Osaka (JP); Kensuke Tsumura, Osaka (JP); Nobuhiko Inui, Osaka (JP); Katsunori Takahashi, Osaka (JP); Koji Taniguchi, Hasuda (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/110,610

(22) PCT Filed: Oct. 12, 2012

(86) PCT No.: PCT/JP2012/076430

§ 371 (c)(1),
(2) Date: Oct. 8, 2013

(87) PCT Pub. No.: WO2013/058181

PCT Pub. Date: Apr. 25, 2013

(65) Prior Publication Data

US 2014/0058046 A1     Feb. 27, 2014

(30) Foreign Application Priority Data

Oct. 18, 2011  (JP) .................................. 2011-228558
Aug. 31, 2012  (JP) .................................. 2012-192197

(51) Int. Cl.
*C08F 292/00* (2006.01)
*C08G 69/48* (2006.01)
(Continued)

(52) U.S. Cl.
CPC ................ *C08F 292/00* (2013.01); *C08J 3/20* (2013.01); *C08K 3/04* (2013.01); *C08L 101/00* (2013.01);
(Continued)

(58) Field of Classification Search
USPC .......... 525/329.1, 55, 420, 462, 333.7, 330.3, 525/333.3
See application file for complete search history.

(56) References Cited

U.S. PATENT DOCUMENTS

2009/0023851 A1   1/2009  Bierdel et al.
2009/0048385 A1   2/2009  Horio
2011/0251331 A1  10/2011  Mcandrew et al.

FOREIGN PATENT DOCUMENTS

CN      1982370 A    6/2007
CN    101263196 A    9/2008
(Continued)

OTHER PUBLICATIONS

International Search Report for the Application No. PCT/JP2012/076430 mailed Jan. 29, 2013.
(Continued)

*Primary Examiner* — Robert Harlan
(74) *Attorney, Agent, or Firm* — Cheng Law Group, PLLC

(57) ABSTRACT

Disclosed herein are: a method for producing a resin composite material in which a carbon material having a graphene structure is dispersed in a synthetic resin and which has high mechanical strength; and a resin composite material obtained by the method. More specifically, disclosed herein are: a method for producing a resin composite material in which a carbon material having a graphene structure is uniformly dispersed in a synthetic resin selected from the group consisting of a crystalline resin and an amorphous resin, the method comprising, when the synthetic resin is a crystalline resin, shear-kneading the crystalline resin and the carbon material with a shear-kneading device at a temperature lower than a melting point of the crystalline resin and, when the synthetic resin is an amorphous resin, shear-kneading the amorphous resin and the carbon material with a shear-kneading device at a temperature close to a Tg of the crystalline resin; and a resin composite material obtained by the production method.

8 Claims, 1 Drawing Sheet

(51) Int. Cl.
  *C08J 3/20* (2006.01)
  *C08K 3/04* (2006.01)
  *C08L 101/00* (2006.01)
  *C08G 64/42* (2006.01)
  *B29C 47/92* (2006.01)
  *B29C 47/60* (2006.01)
  *B29C 47/10* (2006.01)
  *B29C 47/00* (2006.01)
  *B29K 105/16* (2006.01)
  *B29K 507/04* (2006.01)
  *B29C 47/40* (2006.01)

(52) U.S. Cl.
  CPC ............... *C08J 3/203* (2013.01); *C08G 64/42* (2013.01); *C08G 69/48* (2013.01); *B29C 47/0004* (2013.01); *B29C 47/0021* (2013.01); *B29C 47/92* (2013.01); *B29C 2947/92704* (2013.01); *B29K 2995/0041* (2013.01); *B29K 2995/0039* (2013.01); *B29C 47/6018* (2013.01); *B29C 47/1081* (2013.01); *B29K 2105/162* (2013.01); *B29K 2507/04* (2013.01); *B29K 2105/167* (2013.01); *B29C 2947/92876* (2013.01); *B29C 47/402* (2013.01)

(56) References Cited

FOREIGN PATENT DOCUMENTS

| | | | |
|---|---|---|---|
| JP | 10-60287 A | 3/1998 | |
| JP | 2002-347020 A | 4/2002 | |
| JP | 2005-264059 A | 9/2005 | |
| JP | 2007-15333 A | 1/2007 | |
| JP | 4085125 B1 | 5/2008 | |
| JP | 2008-307863 * | 12/2008 | ............... B29B 7/40 |
| JP | 2008-307863 A | 12/2008 | |
| JP | 2010-531911 A | 9/2010 | |
| WO | WO-2011/042800 A1 | 4/2011 | |

OTHER PUBLICATIONS

Written Opinion of the International Searching Authority (PCT/ISA/237) for Application No. PCT/JP2012/076430 mailed Jan. 29, 2013.
Written Opinion of the International Searching Authority (PCT/ISA/237) for Application No. PCT/JP2012/076430 mailed Jan. 29, 2013 (English Translation mailed May 1, 2014).
The First Office Action for the Application No. 201280038796.9 from The State Intellectual Property Office of People's Republic of China dated Nov. 28, 2014.
Supplementary European Search Report for the Application No. EP 12 84 2079 dated Mar. 3, 2015.

* cited by examiner

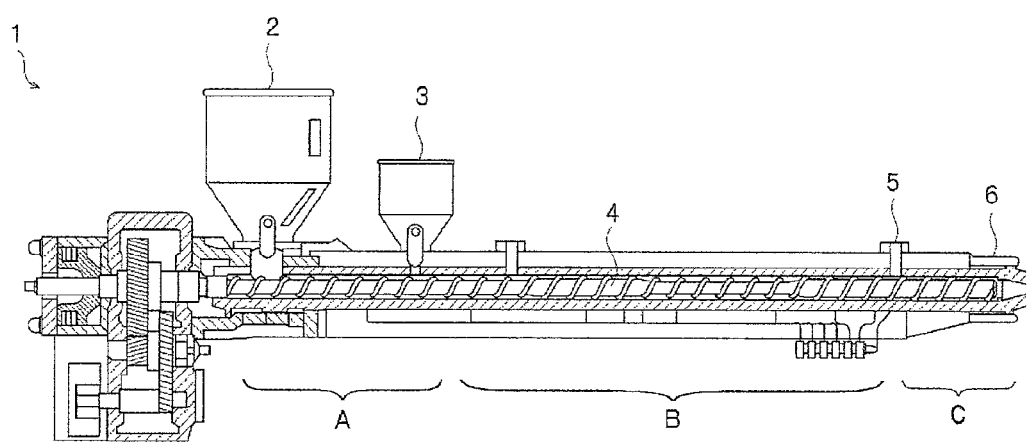

US 9,068,037 B2

METHOD FOR PRODUCING RESIN COMPOSITE MATERIAL, AND RESIN COMPOSITE MATERIAL

TECHNICAL FIELD

The present invention relates to a method for producing a resin composite material in which a carbon material is dispersed in a synthetic resin and a resin composite material, and more particularly relates to a method for producing a resin composite material using a carbon material having a graphene structure and a resin composite material.

BACKGROUND ART

Carbon materials having a graphene sheet structure have received attention due to their high elastic modulus and high electrical conductivity. Compounding of such a carbon material having a graphene structure with a synthetic resin makes it possible to reinforce a product made of the synthetic resin or impart electrical conductivity to the product. Particularly, a graphene sheet, a carbon nanotube, exfoliated graphite or the like has a nanoscale size and a large specific surface area. Therefore, such a carbon material is believed to have a high reinforcing effect when compounded with a resin.

In general, it is preferred that the carbon material is uniformly dispersed in the matrix resin to obtain a more effective composite material. Patent Document 1 discloses a method in which a good solvent for a thermoplastic resin and a carbon material is used to achieve a uniform dispersion state. According to this method, a resin composite material having a uniform dispersion state can be obtained as long as a common solvent for the thermoplastic resin and the carbon material exists.

PRIOR ART DOCUMENT

Patent Document

Patent Document 1: JP-A-2005-264059

SUMMARY OF THE INVENTION

Problems to be Solved by the Invention

However, in the resin composite material described in Patent Document 1, the adhesion strength at an interface between the thermoplastic resin and the carbon material formed after volatilization of the solvent is low. Therefore, when an external force is applied to the obtained resin composite material, there is a case where separation occurs at the interface. In addition, such a carbon material as described above has a large cohesion force derived from a n-stacking force, and is therefore very poor in dispersibility in the solvent. Therefore, the resin composite material has a problem that it does not develop sufficient mechanical strength.

It is therefore an object of the present invention to provide a method for producing a resin composite material in which a carbon material having a graphene structure is dispersed in a synthetic resin and which has high mechanical strength and a resin composite material obtained by the method.

Means for Solving the Problems

The present invention is directed to a method for producing a resin composite material in which a carbon material having a graphene structure is uniformly dispersed in a synthetic resin selected from the group consisting of a crystalline resin and an amorphous resin, the method comprising, when the synthetic resin is a crystalline resin, shear-kneading the crystalline resin and the carbon material with a shear-kneading device at a temperature lower than a melting point of the crystalline resin and, when the synthetic resin is an amorphous resin, shear-kneading the amorphous resin and the carbon material with a shear-kneading device at a temperature close to a Tg of the amorphous resin.

In a specific aspect of the method for producing a resin composite material according to the present invention, the synthetic resin is grafted onto the carbon material when the synthetic resin and the carbon material are shear-kneaded and a grafting ratio of the carbon material contained in the resin composite material is 5 to 3300 wt %. In this case, adhesion between the synthetic resin and the carbon material is further improved. Therefore, the carbon material can be more uniformly dispersed in the synthetic resin. This makes it possible to obtain a resin composite material having further enhanced mechanical strength.

In another specific aspect of the method for producing a resin composite material according to the present invention, after the synthetic resin and the carbon material are shear-kneaded, a resulting resin composite material is melted by heating. In this case, the resulting resin composite material can be easily taken out of the shear-kneading device. Further, the resulting resin composite material can be easily molded into various shapes.

In still another specific aspect of the method for producing a resin composite material according to the present invention, after the synthetic resin and the carbon material are shear-kneaded, a resin of the same as the synthetic resin or a resin different from the synthetic resin is further mixed. In this case, resin composite materials different in physical properties can be easily produced.

In still another specific aspect of the method for producing a resin composite material according to the present invention, the carbon material having a graphene structure is exfoliated graphite or carbon nanotubes. In this case, the carbon material has a nanoscale size and a large specific surface area. This makes it possible to easily produce a resin composite material having further enhanced mechanical strength.

In still another specific aspect of the method for producing a resin composite material according to the present invention, the synthetic resin is a thermoplastic resin. In this case, a resin composite material that can be easily molded is obtained, which makes it possible to easily produce resin composite material products having various shapes.

More preferably, the thermoplastic resin is a crystalline resin. In this case, molecular chains in an amorphous portion contained in the crystalline resin are mainly cut during shear-kneading, and therefore the degree of crystallinity of the crystalline resin is less likely to be reduced. This makes it possible to obtain a resin composite material having further enhanced mechanical strength.

The present invention is also directed to a resin composite material obtained by the method for producing a resin composite material according to the present invention. In the resin composite material, the carbon material having a graphene structure is uniformly dispersed. Therefore, the resin composite material according to the present invention has high mechanical strength.

Effects of the Invention

In the resin composite material production method according to the present invention, a synthetic resin and a carbon material having a graphene structure are shear-kneaded at a temperature lower than the melting point of the synthetic resin or a temperature close to the Tg of the synthetic resin, and therefore the viscosity of the synthetic resin is increased. This makes it possible to apply a high shear force during the shear-kneading.

The synthetic resin is cut by the shear force so that free radicals are generated in the synthetic resin. Therefore, the synthetic resin having free radicals is grafted onto the carbon material so that a chemical bond is formed between the carbon material and the synthetic resin. This makes it possible to improve adhesion between the carbon material and the synthetic resin. In addition, the synthetic resin-grafted carbon material has improved affinity for the synthetic resin and therefore can be uniformly dispersed in the synthetic resin. This makes it possible to obtain a resin composite material having enhanced mechanical strength.

Further, the resin composite material according to the present invention is obtained by the above production method, and therefore the carbon material is uniformly dispersed in the synthetic resin. Therefore, it is possible to provide a resin composite material having high mechanical strength.

BRIEF DESCRIPTION OF THE DRAWING

FIG. 1 is a schematic view of one example of a production device used in a method for producing a resin composite material according to the present invention.

DESCRIPTION OF EMBODIMENTS

Hereinbelow, the present invention will be described in detail.

(Synthetic Resin)

A synthetic resin used in a method for producing a resin composite material according to the present invention is not particularly limited, but is preferably a thermoplastic resin. A resin composite material using a thermoplastic resin can be easily formed into various molded articles by various molding methods by the application of heat. Examples of such a thermoplastic resin include: polyethylenes such as high-density polyethylene, low-density polyethylene, and linear low-density polyethylene; polyolefins typified by polypropylenes such as homo-polypropylene, block-polypropylene, and random-polypropylene; cyclic polyolefins such as norbornene resins; polyvinyl acetate; vinyl acetate copolymers such as ethylene-vinyl acetate; polyvinyl acetate derivatives such as polyvinyl alcohol and polyvinyl butyral; polyesters such as PET, polycarbonate, and polylactic acid; polyether resins such as polyethylene oxide, polyphenylene ether, and polyether ether ketone; acrylic resins such as PMMA; sulfone-based resins such as polysulfone and polyether sulfone; fluorinated resins such as PTFE and PVDF; polyamide resins such as nylon; halogenated resins such as polyvinyl chloride and vinylidene chloride; polystyrene; polyacrylonitrile; and copolymer resins thereof. These synthetic resins may be used singly or in combination of two or more of them. Among them, polyolefins are particularly preferred because they are inexpensive and can be easily molded by the application of heat.

Further, the synthetic resin to be used may be a crystalline resin or an amorphous resin. When a crystalline resin is used as the synthetic resin, the crystalline resin has a crystalline component at a temperature lower than its melting point. Therefore, when the crystalline resin is shear-kneaded at a temperature lower than its melting point, molecular chains in an amorphous portion contained in the crystalline resin are mainly cut. Therefore, the crystalline component contained in the crystalline resin is less likely to be broken during shear-kneading, and therefore the degree of crystallinity of the crystalline resin is less likely to be reduced. Therefore, a resulting resin composite material has a high degree of crystallinity and therefore can have further enhanced mechanical strength.

Examples of the crystalline resin include crystalline polypropylene, crystalline polyethylene, crystalline norbornene, crystalline polyvinyl acetate, crystalline polylactic acid, and semicrystalline PVDF. Among them, inexpensive crystalline polypropylene may be more preferably used.

Examples of the amorphous resin include atactic polypropylene, amorphous norbornene, amorphous PET, amorphous polycarbonate, polyphenylene ether, polyether ether ketone, atactic PMMA, polysulfone, polyether sulfone, and atactic polystyrene. Among them, inexpensive atactic polypropylene may be more preferably used.

(Carbon Material Having Graphene Structure)

In the present invention, a carbon material having a graphene structure is used to impart a reinforcing effect to a resin composite material or, in some cases, to impart electrical conductivity to a resin composite material. The carbon material having a graphene structure is not particularly limited, but exfoliated graphite or carbon nanotubes may be preferably used. As the carbon material, a stack of graphene sheets, that is, exfoliated graphite is more preferably used. In the present invention, the exfoliated graphite is one obtained by flaking original graphite and refers to a stack of graphene sheets thinner than the original graphite. The number of graphene sheet layers stacked in the exfoliated graphite shall be smaller than that in original graphite, and is usually several layers to about 200 layers.

The exfoliated graphite has a shape having a relatively large specific surface area. Therefore, by uniformly dispersing the exfoliated graphite in a resin composite material in accordance with the present invention, it is possible to effectively enhance the mechanical strength of the resin composite material against an external force applied in a direction intersecting with the graphene sheet stacking plane of the exfoliated graphite. It is to be noted that in the present invention, the specific surface area refers to a BET specific surface area measured by a three-point BET method.

Preferred lower limit and upper limit of the BET specific surface area of the exfoliated graphite are 15 $m^2/g$ and 2700 $m^2/g$, respectively. If the specific surface area of the exfoliated graphite is less than 15 $m^2/g$, there is a case where the mechanical strength against an external force applied in a direction intersecting with the stacking plane cannot be sufficiently enhanced. On the other hand, the theoretical BET specific surface area of a single-layer graphene sheet is 2700 $m^2/g$, which is a limit value.

The mixing ratio between the carbon material and the synthetic resin is not particularly limited, but the amount of the carbon material mixed is preferably in the range of 1 to 50 parts by weight with respect to 100 parts by weight of the synthetic resin. If the amount of the carbon material mixed is less than 1 part by weight, there is a case where a resin composite material having sufficiently enhanced mechanical strength cannot be obtained. If the amount of the carbon material mixed exceeds 50 parts by weight, a resin composite material having increased stiffness can be obtained but there is a case where the resin composite material is brittle and is therefore likely to be broken.

(Other Components)

In the method for producing a resin composite material according to the present invention, various additives may be used without impairing the object of the present invention. Examples of such an additive include: phenol-, phosphorus-, amine-, or sulfur-based antioxidants; metal harm inhibitors; halogenated flame retardants such as hexabromobiphenyl ether and decabromodiphenyl ether; flame retardants such as ammonium polyphosphate and trimethyl phosphate; various fillers; antistatic agents; stabilizers; and pigments.

Further, in the method for producing a resin composite material according to the present invention, an appropriate polymerization initiator commonly used may be used to initiate a radical reaction. When the synthetic resin is a crystalline resin, such a polymerization initiator selectively cuts molecules in the amorphous portion of the crystalline resin, and therefore the degradation of the matrix resin is suppressed. Examples of the polymerization initiator include peroxides, peroxide compounds, azo-based compounds, and dihalogen-based compounds. These radical initiators may be used singly or in combination of two or more of them.

Further, in the method for producing a resin composite material according to the present invention, an appropriate reaction aid commonly used to promote a radical reaction may be used. Such a reaction aid may be used in production of a resin composite material according to the present invention to promote a grafting reaction of the synthetic resin onto the carbon material. Examples of such a reaction aid include divinylbenzene, trimethylolpropane trimethacrylate, 1,9-nonanediol dimethacrylate, 1,10-decanediol dimethacrylate, trimellitic acid triallyl ester, triallyl isocyanurate, ethylvinyl benzene, neopentylglycol dimethacrylate, 1,6-hexanediol dimethacrylate, lauryl methacrylate, stearyl methacrylate, diallyl phthalate, diallyl terephthalate, and diallyl isophthalate.

If the amounts of the polymerization initiator and the reaction aid added are too large, there is a case where a large amount of polymerization products of the reaction aid are produced. This sometimes degrades the appearance of a resulting resin composite material. For this reason, the amount of the reaction aid mixed is preferably 10 parts by weight or less, more preferably 8 parts by weight or less with respect to 100 parts by weight of the synthetic resin.

(Production Method)

In the method for producing a resin composite material according to the present invention, the synthetic resin, the carbon material having a graphene structure, and if necessary, the reaction aid and the additive are shear-kneaded using a shear-kneading device. When the synthetic resin is a crystalline resin, the shear-kneading is performed at a temperature lower than the melting point of the crystalline resin. When the synthetic resin is an amorphous resin, the shear-kneading is performed at a temperature close to the Tg of the amorphous resin.

It is to be noted that in the present invention, the melting point of the crystalline resin refers to a melting peak temperature determined by DSC (differential scanning calorimetry) measurement based on JIS K7121. The temperature close to the Tg of the amorphous resin refers to a temperature in the range of ±20° C. around a midpoint glass transition temperature determined by DSC measurement based on JIS K7121.

In the method for producing a resin composite material according to the present invention, the synthetic resin and the carbon material having a graphene structure are shear-kneaded at a temperature lower than the melting point of the synthetic resin or a temperature close to the Tg of the synthetic resin, and therefore the viscosity of the synthetic resin is increased. Therefore, a high shear force can be applied during the shear-kneading. The synthetic resin is cut by the shear force so that free radicals are generated in the synthetic resin. On the other hand, the carbon material having a graphene structure has the property of easily attracting free radicals by delocalizing the free radicals. Therefore, the free radicals are attracted to the carbon material so that the carbon material and the synthetic resin are firmly bonded to each other by a grafting reaction. This makes it possible to improve adhesion between the carbon material and the synthetic resin. In addition, the synthetic resin-grafted carbon material has improved affinity for the synthetic resin. Therefore, the carbon material can be uniformly dispersed in the synthetic resin. This makes it possible to obtain a resin composite material having enhanced mechanical strength.

One example of a method for shear-kneading the synthetic resin and the carbon material will be described with reference to a production device shown in FIG. 1. FIG. 1 is a schematic view of a co-rotating twin screw extruder 1 that shear-kneads the synthetic resin and the carbon material used in the present invention. In the co-rotating twin screw extruder 1, the synthetic resin and the carbon material are first supplied to a supply part A through a raw material hopper 2 and a side feeder 3, respectively. Then, the synthetic resin and the carbon material are transferred to a shear-kneading part B while being kneaded in the supply part A by rotating a screw part 4.

The shear-kneading part B is a main part that shear-kneads the synthetic resin and the carbon material, and is set to a temperature lower than the melting point of the synthetic resin or a temperature close to the Tg of the synthetic resin. In the shear-kneading part B, the synthetic resin and the carbon material are set to a temperature lower than the melting point of the synthetic resin when the synthetic resin is a crystalline resin, and are set to a temperature close to the Tg of the synthetic resin when the synthetic resin is an amorphous resin so that the synthetic resin and the carbon material are shear-kneaded by rotating the screw part 4 in a state where the synthetic resin has increased viscosity. This makes it possible to obtain a resin composite material in which the carbon material is uniformly dispersed in the synthetic resin.

Then, the resin composite material is transferred to a discharge part C by rotating the screw part 4. In the discharge part C, pressure is released through a vent 5, if necessary, and then the resin composite material is discharged to the outside of the extruder through a rotary gate valve 6. It is to be noted that in the discharge part C, the resin composite material preferably has a temperature equal to or higher than the melting point of the synthetic resin so that the resin composite material is melted and easily discharged.

However, the shear-kneading method is not limited to the method using the co-rotating twin screw extruder 1. The shear-kneading method is not particularly limited as long as shear-kneading is performed at a temperature lower than the melting point of the synthetic resin or a temperature close to the Tg of the synthetic resin, and various well-known shear-kneading methods may be used. A preferred example of the shear-kneading method includes a method using a shear-kneading device equipped with a kneading screw, such as a twin-screw kneader (e.g., Plastomill), a single-screw extruder, a twin-screw extruder, Banbury mixer, or a roll.

More preferably, a shear-kneader that will be described below may be used. The shear-kneader has a pair of disks opposed to each other across a gap of about 0.1 to 2 mm. At least one of the pair of disks has a supply port for supplying a material to the gap. The supply port passes through the center of the disk from the outer surface to the inner surface.

At least one of the pair of disks is connected to a rotary drive part. Therefore, the one of the disks is rotated with respect to the other disk. This makes it possible to apply a shear force to a material supplied to the gap and shear-knead the material.

It is to be noted that the disk may have irregularities on its inner surface opposed to the other disk across a gap. In this case, a shear force can be more effectively applied to the material by the surface irregularities.

In the present invention, in order to apply a high shear force to the synthetic resin, shear-kneading needs to be performed at a temperature lower than the melting point of the synthetic resin when the synthetic resin is a crystalline resin or at a temperature close to the Tg of the synthetic resin when the synthetic resin is an amorphous resin. A synthetic resin has the property of increasing in viscosity at a low temperature, especially the property of significantly increasing in viscosity at a temperature equal to or lower than its melting point or softening point. Therefore, a very high shear force can be applied to the synthetic resin by shear-kneading the synthetic resin at a temperature lower than the melting point of the synthetic resin or a temperature close to the Tg of the synthetic resin even when the rotation speed of the screw of the kneading device is low.

Before or after the shear-kneading, shear-kneading may be performed at a temperature equal to or higher than the melting point or Tg of the synthetic resin. For example, in the method using the co-rotating twin screw extruder 1, the supply part A and the discharge part C may be set to a temperature equal to or higher than the melting point or Tg of the synthetic resin as long as shear-kneading in the shear-kneading part B is performed at a temperature lower than the melting point of the synthetic resin or a temperature close to the Tg of the synthetic resin.

Further, after the shear-kneading, a resulting resin composite material is preferably melted by heating to a temperature equal to or higher than the melting point or Tg. This makes it possible to easily take the resin composite material obtained by the production method according to the present invention out of the shear-kneading device. Further, the resin composite material in its molten state can be easily molded into various shapes.

In the production method according to the present invention, the synthetic resin is preferably grafted onto the carbon material by the shear-kneading so that the grafting ratio of the carbon material is in the range of 5 to 3300 wt %. In the present invention, the grafting ratio of the carbon material refers to the ratio of the weight of the synthetic resin directly forming a chemical bond with the carbon material in the resin composite material by grafting to the weight of the carbon material contained in the resin composite material. By setting the grafting ratio of the carbon material to a value within the above range, it is possible to effectively enhance the mechanical strength of the resin composite material obtained by the production method according to the present invention.

If the grafting ratio of the carbon material is less than 5 wt %, there is a case where adhesion between the synthetic resin and the carbon material cannot be sufficiently improved. Therefore, there is a case where the mechanical strength of a resulting resin composite material cannot be sufficiently enhanced. If the grafting ratio of the carbon material exceeds 3300 wt %, there is a case where the effect is saturated so that the mechanical strength cannot be enhanced any more. The grafting ratio of the carbon material is preferably in the range of 10 to 2000 wt %, more preferably in the range of 30 to 1000 wt %.

It is to be noted that the grafting ratio of the carbon material contained in the resin composite material can be measured in the following manner. For example, the synthetic resin contained in the resin composite material but not grafted onto the carbon material is removed by dissolution in a solvent to isolate a grafted carbon material. Then, the grafted carbon material is subjected to thermogravimetric analysis (TGA) in an air atmosphere in a temperature range of 30 to 600° C. at a temperature rise rate of 10° C./min. At this time, the amount of matter decomposed before the temperature is increased to 500° C. is defined as A wt % and the amount of matter remaining undecomposed even when the temperature is increased to 500° C. is defined as B wt % to determine the grafting ratio of the carbon material by the following formula.

Grafting ratio(wt %)=$A/B \times 100$

The solvent is not particularly limited as long as it can dissolve the synthetic resin not grafted onto the carbon material but hardly dissolves the grafted carbon material, and any appropriate solvent can be used. For example, when the synthetic resin is an olefin-based resin, hot xylene at 130° C. or the like can be used. When the synthetic resin is an acrylic resin such as PMMA, acetone, dichlorobenzene, or the like can be used. When the synthetic resin is a polyamide-based resin such as nylon, hot benzyl alcohol at 200° C., hot nitrobenzene at 200° C., or the like can be used. When the synthetic resin is a polystyrene-based resin, THF, dichlorobenzene, or the like can be used. When the synthetic resin is a polycarbonate-based resin, THF, dichloromethane, or the like can be used.

Further, in the method for producing a resin composite material according to the present invention, a resin of the same type as the synthetic resin or a resin different from the synthetic resin may further be mixed after the shear-kneading. This makes it possible to easily produce resin composite materials different in physical properties.

As the resin different from the synthetic resin, various thermoplastic resins or thermosetting resins can be used. Examples of the thermoplastic resin include polyolefins, vinyl acetate copolymers or derivatives thereof, polyesters, polyether resins, acrylic resins, sulfone-based resins, fluorinated resins, polyamide resins, halogenated resins, polystyrene, polyacrylonitrile, and copolymer resins thereof. Examples of the thermosetting resin include epoxy resins and polyurethane resins. The resins of the same type as the synthetic resin or the resins different from the synthetic resin may be used singly or in combination of two or more of them.

The mixing ratio between the resin composite material obtained by the shear-kneading and the resin of the same type as the synthetic resin or the resin different from the synthetic resin is not particularly limited, but the amount of the additional resin mixed is preferably 1000 parts by weight or less with respect to 100 parts by weight of the resin composition. If the amount of the resin of the same type as the synthetic resin or the resin different from the synthetic resin exceeds 1000 parts by weight, there is a case where the carbon material contained in the resin composite material cannot sufficiently exert its mechanical strength-enhancing effect.

In the resin composite material obtained by the production method according to the present invention, the carbon material is uniformly dispersed in the synthetic resin. Therefore, the mechanical strength of the resin composite material according to the present invention is effectively enhanced.

The use of the resin composite material obtained by the production method according to the present invention makes it possible to produce various products having high mechanical strength. For example, a resin composite material sheet having high mechanical strength such as tensile elastic modulus or bending elastic modulus can be produced by press-molding the resin composite material into a sheet. However, a product produced using the resin composite material according to the present invention or the resin composite material obtained by the production method according to the present invention is not particularly limited, and the product can be molded into any appropriate shape.

The resin composite material obtained by the production method according to the present invention contains the carbon material having a graphene structure. This makes it possible for the resin composite material to develop electrical conductivity. Therefore, the resin composite material has the potential for use also as a material that develops electrical conductivity.

Hereinbelow, the present invention will become apparent from specific examples and comparative examples of the present invention. It is to be noted that the present invention is not limited to the following examples.

Example 1

The temperatures of the supply part A, the shear-kneading part B, and the discharge part C of the co-rotating twin screw extruder 1 shown in FIG. 1 (screw diameter of screw part 4=10 mm, screw effective length/screw diameter=60) were set to 120 to 180° C., 90 to 120° C., and 180 to 200° C., respectively.

100 parts by weight of a polypropylene-based resin (manufactured by Prime Polymer Co., Ltd. under the trade name of "J-721GR", melting point: 170° C., tensile elastic modulus at 23° C.: 1.2 GPa, MFR=11 g/min) and 20 parts by weight of exfoliated graphite M (manufactured by XG Sciences under the trade name of "xGnP-5", maximum size in direction parallel to plane of layer determined by observation with SEM before use: about 5.0 μm, layer thickness: about 60 nm, number of stacked graphene sheets: about 180 layers, BET specific surface area: 75 m$^2$/g) were supplied to the supply part A of the co-rotating twin screw extruder 1 through the raw material hopper 2 and the side feeder 3, respectively.

Then, the polypropylene-based resin and the exfoliated graphite supplied to the supply part were kneaded by rotating the screw part 4 (rotation speed: 75 rpm) of the co-rotating twin screw extruder 1 and transferred to the shear-kneading part B. Then, the polypropylene-based resin and the exfoliated graphite were shear-kneaded in the shear-kneading part B, set to a temperature of 90 to 120° C., by rotating the screw part 4 to obtain a resin composite material. Then, the resin composite material was transferred to the discharge part C and extruded through a T-die attached to the rotary gate valve 6 of the discharge part C.

The resin composite material extruded through the T-die was formed into a sheet by a cooling roll to obtain a resin composite material sheet having a thickness of 500 μm.

Example 2

A resin composite sheet was obtained in the same manner as in Example 1 except that 5 parts by weight of exfoliated graphite N (internally produced using graphite powder, maximum size in direction parallel to plane of layer determined by observation with SEM before use: about 0.3 μm, layer thickness: about 2.6 nm, number of stacked graphene sheets: about 8 layers, BET specific surface area: 300 m$^2$/g) was used instead of 20 parts by weight of the exfoliated graphite M.

Example 3

The temperatures of the supply part A, the shear-kneading part B, and the discharge part C of the co-rotating twin screw extruder 1 were set to 100 to 140° C., 60 to 80° C., and 140 to 150° C., respectively. A polyethylene-based resin (manufactured by Japan Polyethylene Corporation under the trade name of "HF560", melting point: 135° C., tensile elastic modulus at 23° C.: 1.1 GPa) was used instead of the polypropylene-based resin. A resin composite sheet was obtained in the same manner as in Example 1 except the above.

Example 4

The temperatures of the supply part A, the shear-kneading part B, and the discharge part C of the co-rotating twin screw extruder 1 were set to 80 to 130° C., 90 to 120° C., and 220 to 240° C., respectively.

100 parts by weight of polymethylmethacrylate PMMA (manufactured by Sumitomo Chemical Co., Ltd. under the trade name of "SUMIPEX EX", glass transition temperature: 100° C., tensile elastic modulus at 23° C.: 3.1 GPa) and 5 parts by weight of the exfoliated graphite N were used instead of 100 parts by weight of the polypropylene-based resin and 20 parts by weight of the exfoliated graphite M. A resin composite sheet was obtained in the same manner as in Example 1 except the above.

Example 5

The temperatures of the supply part A, the shear-kneading part 13, and the discharge part C of the co-rotating twin screw extruder 1 were set to 60 to 100° C., 70 to 90° C., and 190 to 220° C., respectively.

100 parts by weight of a polystyrene-based resin (manufactured by Toyo-Styrene Co., Ltd. under the trade name of "Toyo Styrol GP HRM26", melting point: 230° C., bending elastic modulus at 23° C.: 3.5 GPa) and 5 parts by weight of the exfoliated graphite N were used instead of the polypropylene-based resin and the exfoliated graphite M. A resin composite sheet was obtained in the same manner as in Example 1 except the above.

Example 6

The temperatures of the supply part A, the shear-kneading part B, and the discharge part C of the co-rotating twin screw extruder 1 were set to 200 to 280° C., 190 to 210° C., and 270 to 290° C., respectively.

100 parts by weight of a polyamide-based resin (manufactured by UNITIKA Ltd. under the trade name of "A-125J", melting point: 267° C., tensile elastic modulus at 23° C.: 1.0 GPa) and 10 parts by weight of the exfoliated graphite M were used instead of the polypropylene-based resin and the exfoliated graphite M. A resin composite sheet was obtained in the same manner as in Example 1 except the above.

Example 7

The temperatures of the supply part A, the shear-kneading part B, and the discharge part C of the co-rotating twin screw extruder 1 were set to 200 to 320° C., 170 to 190° C., and 320 to 340° C., respectively.

100 parts by weight of a polyacrylonitrile-based resin (manufactured by Mitsui Chemicals Inc. under the trade name of "Mitsui Barex #1000", melting point: 317° C., bending elastic modulus at 23° C.: 3.3 GPa) and 10 parts by weight of the exfoliated graphite M were used instead of the polypropylene-based resin and the exfoliated graphite M. A resin composite sheet was obtained in the same manner as in Example 1 except the above.

Example 8

The temperatures of the supply part A, the shear-kneading part B, and the discharge part C of the co-rotating twin screw extruder 1 were set to 100 to 170° C., 140 to 160° C., and 230 to 270° C., respectively.

A polycarbonate-based resin (manufactured by Sumika Styron Polycarbonate Limited under the trade name of "CALIBRE 301-15", glass transition point: 150° C., tensile elastic modulus at 23° C.: 2.3 GPa) was used instead of the polypropylene-based resin. A resin composite sheet was obtained in the same manner as in Example 1 except the above.

Example 9

A side feeder 7 was provided next to the side feeder 3 of the co-rotating twin screw extruder 1. 100 parts by weight of the polypropylene-based resin, 5 parts by weight of the exfoliated graphite N, and 1.4 parts by weight of azobisisobutyronitrile AIBN (manufactured by Wako Pure Chemical Industries Ltd. under the trade name of "V-70", ten-hour half-life temperature: 65° C.) as a radical initiator were supplied to the supply part A of the co-rotating twin screw extruder 1 through the raw material hopper 2, the side feeder 3, and the side feeder 7, respectively. The temperatures of the supply part A, the shear-kneading part B, and the discharge part C were set to 60 to 80° C., 90 to 120° C., and 190 to 210° C., respectively. A resin composite material sheet was obtained in the same manner as in Example 1 except the above.

Example 10

A side feeder 7 was provided next to the side feeder 3 of the co-rotating twin screw extruder 1. 100 parts by weight of the polypropylene-based resin, 5 parts by weight of the exfoliated graphite N, and 1.9 parts by weight of bis(4-t-butylcyclohexyl)peroxydicarbonate (manufactured by NOF Corporation under the trade name of "PEROYL TCP", one-minute half-life temperature: 92° C.) as a radical initiator were supplied to the supply part A of the co-rotating twin screw extruder 1 through the raw material hopper 2, the side feeder 3, and the side feeder 7, respectively. The temperatures of the supply part A, the shear-kneading part B, and the discharge part C were set to 60 to 80° C., 90 to 120° C., and 190 to 210° C., respectively. A resin composite material sheet was obtained in the same manner as in Example 1 except the above.

Comparative Example 1

A resin composite sheet was obtained in the same manner as in Example 1 except that the temperature of the kneading part was set to 190 to 220° C.

Comparative Example 2

A resin composite sheet was obtained in the same manner as in Example 2 except that the temperature of the kneading part was set to 190 to 220° C.

Comparative Example 3

A resin composite sheet was obtained in the same manner as in Example 3 except that the temperature of the kneading part was set to 150 to 180° C.

Comparative Example 4

A resin composite sheet was obtained in the same manner as in Example 4 except that the temperature of the kneading part was set to 220 to 240° C.

Comparative Example 5

A resin composite sheet was obtained in the same manner as in Example 5 except that the temperature of the kneading part was set to 190 to 220° C.

Comparative Example 6

A resin composite sheet was obtained in the same manner as in Example 6 except that the temperature of the kneading part was set to 270 to 290° C.

Comparative Example 7

A resin composite sheet was obtained in the same manner as in Example 7 except that the temperature of the kneading part was set to 32 to 340° C.

Comparative Example 8

A resin composite sheet was obtained in the same manner as in Example 8 except that the temperature of the kneading part was set to 230 to 270° C.

Comparative Example 9

A resin composite sheet was obtained in the same manner as in Example 9 except that the temperature of the kneading part was set to 190 to 210° C.

Comparative Example 10

A resin composite sheet was obtained in the same manner as in Example 10 except that the temperature of the kneading part was set to 190 to 210° C.

(Evaluation of Examples and Comparative Examples)

The grafting ratio of the exfoliated graphite contained in each of the resin composite material sheets obtained in Examples 1 to 10 and Comparative Examples 1 to 10 and the tensile elastic modulus or bending elastic modulus of each of the resin composite material sheets were evaluated in the following manner.

(1) Evaluation of Grafting Ratio of Exfoliated Graphite

Each of the obtained resin composite material sheets was cut into small resin composite material pieces. Then, the resin composite material pieces were wrapped in filter paper. The edges of the filter paper were folded inwards and the periphery of the filter paper was further sealed with metal clips to prevent the resin composite material pieces from leaking out of the filter paper. The thus obtained package was immersed in an excess amount of hot xylene at 130° C. for 12 hours. In this way, the synthetic resin contained in the resin composite material sheet but not grafted onto the carbon material was removed by dissolution. Then, the package was taken out of hot xylene and dried in a vacuum to isolate the exfoliated graphite.

The thus isolated exfoliated graphite was subjected to thermogravimetric analysis (TGA) in an air atmosphere in a temperature range of 30 to 600° C. at a temperature rise rate of 10° C./min. At this time, the amount of matter decomposed before the temperature was increased to 500° C. was defined as A wt % and the amount of matter remaining undecomposed even when the temperature was increased to 500° C. was defined as B wt % to determine the grafting ratio of the grafted exfoliated graphite by the following formula.

Grafting ratio(wt %)=$A/B$×100

(2) Evaluation of Tensile Elastic Modulus

The tensile elastic modulus at 23° C. of each of the resin composite material sheets of Examples 1 to 4, 6, and 8 to 10 and Comparative Examples 1 to 4, 6, and 8 to 10 was measured in accordance with JIS K6767.

(3) Evaluation of Bending Elastic Modulus

The bending elastic modulus at 23° C. of each of the resin composite material sheets of Examples 5 and 7 and Comparative Examples 5 and 7 was measured in accordance with JIS . . . .

The materials used in Examples 1 to 10 and Comparative Examples 1 to 10 and the evaluation results are shown together in the following Tables 1 and 2.

It is to be noted that abbreviations in Tables 1 and 2 are as follows.

PP: polypropylene
PE: polyethylene
PMMA: polymethylmethacrylate
PS: polystyrene
PA: polyamide
PAN: polyacrylonitrile-based resin
PC: polycarbonate
AIBN: azobisisobutyronitrile
PO: bis(4-t-butylcyclohexyl)peroxydicarbonate

TABLE 1

| | | Product number or unit | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Polymer | PP | J-721GR | 100 | 100 | | | | | | | 100 | 100 |
| | PE | HF560 | | | 100 | | | | | | | |
| | PMMA | SUMIPEX EX | | | | 100 | | | | | | |
| | PS | HRM26 | | | | | 100 | | | | | |
| | PA | A125J | | | | | | 100 | | | | |
| | PAN | Barex #1000 | | | | | | | 100 | | | |
| | PC | CALIBRE 301-15 | | | | | | | | 100 | | |
| Filler | Exfoliated graphite M | 75 m$^2$/g | 20 | | 20 | | | 10 | 10 | 20 | | |
| | Exfoliated graphite N | 300 m$^2$/g | | 5 | | 5 | 5 | | | | 5 | 5 |
| Initiator | AIBN | V-70 | | | | | | | | | 1.4 | |
| | PO | PEROYL TCP | | | | | | | | | | 1.9 |
| Kneading temperature | | (° C.) | 90-120 | 90-120 | 60-80 | 90-120 | 70-90 | 190-210 | 170-190 | 160-180 | 90-120 | 90-120 |
| Properties | Grafting ratio | (wt %) | 110 | 178 | 151 | 79 | 144 | 29 | 65 | 27 | 240 | 230 |
| | Tensile elastic modulus | (GPa) | 5.1 | 3.0 | 5.0 | 4.4 | | 2.3 | | 5.4 | 4.5 | 4.6 |
| | Bending elastic modulus | (GPa) | | | | | 4.7 | | 4.4 | | | |

TABLE 2

| | | Product number or unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|
| Polymer | PP | J-721GR | 100 | 100 | | | | | | | 100 | 100 |
| | PE | HF560 | | | 100 | | | | | | | |
| | PMMA | SUMIPEX EX | | | | 100 | | | | | | |
| | PS | HRM26 | | | | | 100 | | | | | |
| | PA | UNITIKA A-125J | | | | | | 100 | | | | |
| | PAN | Mitsui Barex #1000 | | | | | | | 100 | | | |
| | PC | CALIBRE 301-15 | | | | | | | | 100 | | |
| Filler | Exfoliated graphite M | 75 m$^2$/g | 20 | | 20 | | | 10 | 10 | 20 | | |
| | Exfoliated graphite N | 300 m$^2$/g | | 5 | | 5 | 5 | | | | 5 | 5 |
| Initiator | AIBN | V-70 | | | | | | | | | 1.4 | |
| | PO | NYPER BW | | | | | | | | | | 1.9 |
| Kneading temperature | | (° C.) | 190-220 | 190-220 | 150-180 | 220-240 | 190-220 | 270-290 | 320-340 | 230-270 | 190-210 | 190-210 |
| Properties | Grafting ratio | (wt %) | 0 | 0 | 0 | 0 | 0 | 0 | 0 | 0 | 190 | 190 |
| | Tensile elastic modulus | (GPa) | 3.0 | 2.2 | 2.6 | 3.4 | | 1.8 | | 4.1 | 0.8 | 1.1 |
| | Bending elastic modulus | (GPa) | | | | | 3.5 | | 3.8 | | | |

As is clear from Table 1, in each of the resin composite material sheets obtained in Examples 1 to 10, a large amount of the synthetic resin was grafted onto the exfoliated graphite. On the other hand, in each of the resin composite material sheets obtained in Comparative Examples 1 to 8, the synthetic resin was hardly grafted onto the exfoliated graphite.

Further, the resin composite material sheets obtained in Examples 1 to 10 had much higher mechanical strength than the resin composite material sheets obtained in Comparative Examples 1 to 10. The reason for this is considered to be that a large amount of the synthetic resin was grafted onto the exfoliated graphite. This is considered to improve adhesion between the carbon material and the synthetic resin and the affinity of the carbon material for the synthetic resin so that the carbon material is uniformly dispersed in the synthetic resin.

Further, as is clear from Table 1, in each of the resin composite material sheets obtained in Examples 9 and 10, a larger amount of the synthetic resin was grafted onto the exfoliated graphite. Therefore, their tensile elastic moduli are higher than that of the corresponding resin composite material sheet of Example 2. On the other hand, the synthetic resin sheets obtained in Comparative Examples 9 and 10 have a low tensile elastic modulus in spite of the fact that grafting occurred. The reason why their elastic moduli are low in spite of the fact that grafting occurred is considered to be that the polymerization initiator added degraded the matrix resin. On the other hand, the reason why the resin composite material sheets of Examples 9 and 10 have a high tensile elastic modulus is considered to be that only the amorphous portion of the crystalline resin was cleaved and grafted onto the exfoliated graphite and therefore the degradation of the matrix resin was suppressed.

DESCRIPTION OF REFERENCE NUMERALS

1 . . . Co-rotating twin screw extruder
2 . . . Raw material hopper
3 . . . Side feeder
4 . . . Screw part
5 . . . Vent
6 . . . Rotary gate valve
A . . . Supply part
B . . . Shear-kneading part
C . . . Discharge part

The invention claimed is:

1. A method for producing a resin composite material in which a carbon material having a graphene structure is uniformly dispersed in a synthetic resin selected from the group consisting of a crystalline resin and an amorphous resin, the method comprising:
    when the synthetic resin is a crystalline resin, shear-kneading the crystalline resin and the carbon material with a shear-kneading device at a temperature lower than a melting point of the crystalline resin; and
    when the synthetic resin is an amorphous resin, shear-kneading the amorphous resin and the carbon material with a shear-kneading device at a temperature close to a Tg of the amorphous resin;
    wherein the synthetic resin is grafted onto the carbon, material when the synthetic resin and the carbon material, are shear-kneaded.

2. The method for producing a resin composite material according to claim 1, wherein a grafting ratio of the carbon material contained in the resin composite material is 5 wt % to 3300 wt %.

3. The method for producing a resin composite material according to claim 1, wherein after the synthetic resin and the carbon material are shear-kneaded, a resulting resin composite material is melted by heating.

4. The method for producing a resin composite material according to claim 1, wherein after the synthetic resin and the carbon material are shear-kneaded, a resin of the same as the synthetic resin or a resin different from the synthetic resin is further mixed.

5. The method for producing a resin composite material according to claim 1, wherein the carbon material having a graphene structure is exfoliated graphite or carbon nanotubes.

6. The method for producing a resin composite material according to claim 1, wherein the synthetic resin is a thermoplastic resin.

7. The method for producing a resin composite material according to claim 6, wherein the themoplastic resin is a crystalline resin.

8. A resin composite material obtained by the method for producing a resin composite material according to claim 1.

* * * * *